United States Patent [19]
Urbish et al.

[11] Patent Number: 5,559,614
[45] Date of Patent: Sep. 24, 1996

[54] LIQUID CRYSTAL DISPLAY WITH INTEGRAL HEATER AND METHOD OF FABRICATING SAME

[75] Inventors: Glenn F. Urbish; Dale W. Dorinski, both of Coral Springs; Thomas J. Swirbel, Davie, all of Fla.

[73] Assignee: Motorola, Inc., Schaumburg, Ill.

[21] Appl. No.: 432,346

[22] Filed: May 1, 1995

[51] Int. Cl.⁶ .................................................. G02F 1/133
[52] U.S. Cl. ............................................ 359/44; 359/86
[58] Field of Search ................................ 359/44, 86, 87

[56] References Cited

U.S. PATENT DOCUMENTS

| | | | |
|---|---|---|---|
| 4,093,355 | 6/1978 | Kaplit et al. | 359/44 |
| 4,119,842 | 10/1978 | Hayden et al. | 359/86 |
| 4,391,492 | 7/1983 | Lu et al. | 359/44 |
| 4,643,525 | 2/1987 | Haim | 359/86 |
| 4,723,835 | 2/1988 | Franklin | 359/86 |
| 4,773,735 | 9/1988 | Ukrainsky et al. | 359/86 |
| 4,985,312 | 1/1991 | Furuya et al. | 428/627 |
| 4,987,289 | 1/1991 | Bishop et al. | 219/209 |

FOREIGN PATENT DOCUMENTS

| | | | |
|---|---|---|---|
| 59-15222 | 1/1984 | Japan | 359/44 |
| 61-252528 | 11/1986 | Japan | 359/44 |
| 62-153835 | 7/1987 | Japan | 359/44 |
| 04-171420 | 6/1992 | Japan | |

*Primary Examiner*—Anita Pellman Gross
*Assistant Examiner*—Toan Ton
*Attorney, Agent, or Firm*—Dale W. Dorinski

[57] ABSTRACT

A liquid crystal display device (11) is made by sputtering a layer of indium-tin oxide and copper on a transparent substrate. This metal layer is photodelineated to form a pattern of electrodes (17) and heating elements (81), the heating elements being interlaced between the electrodes. The heating elements are converted to a more resistive form by applying a constant voltage signal to only the heating elements in an oxygen-containing atmosphere. The assembled LCD has the heating elements on the inside of the display, so that when the heating elements are pulsed, they heat only a portion of the liquid crystal fluid in the immediate proximity. The heaters are activated by a signal from a display driver.

8 Claims, 2 Drawing Sheets

5,559,614

LIQUID CRYSTAL DISPLAY WITH INTEGRAL HEATER AND METHOD OF FABRICATING SAME

TECHNICAL FIELD

This invention relates to nematic liquid crystal displays (LCD), and more specifically to heating LCDs so that they can perform in an acceptable manner.

BACKGROUND

Solid state components such as nematic liquid crystal (LCD) displays are often temperature-dependent in their normal operating characteristics. When the nematic crystalline substances are exposed to driving voltages, they tend to align themselves to provide a desired reflectivity of light. When such substances are arrayed in a pattern, different portions of the substances can be provided with different driving voltages, thereby creating an image. Because of the different characteristics of these substances at different temperatures, their performance is a function of the environment. At temperatures of approximately −20 degrees C. and below, the LCD fluid becomes too viscous to respond to an applied electric potential within a specified time, and the LCD display elements do not turn on. Although most LCD materials can be utilized in a static mode between temperatures of −20 and −40 degrees C., the application of heater power is necessary for dynamic operation of the display at low temperatures. Separate heaters have been provided with LCDs so that the device operates at low temperatures. Typically, one side of the heater is permanently connected to a DC potential and the other side of the heater is switchably connected to ground to activate and deactivate the heater in response to LCD temperature. The separate heater has a number of disadvantages. In order to heat the display fluid to a fixed temperature, the heater must be hotter than the desired display temperature. The difference in temperature between the display and the heater is proportional to the low temperature turn on time of the LCD. The hotter the heater, the faster the display will commence operation during a cold temperature startup. Since it is the fluid in the LCD and not the remainder of the unit that must be heated, most of the energy provided by the heater is wasted. Additionally, the time required to heat the fluid is proportional to the distance between the fluid and the heating element. The closer the heater is to the fluid, the faster the fluid can be heated. Thus, LCDs with separate heaters tend to exhibit sluggish cold temperature response, and other LCDs have been manufactured with an integral heater element. This heater traditionally comprises a thin sheet of, for example, indium tin oxide (ITO) on the back of the rear glass plate of the display, on the front of which are deposited the LCD electrodes. The heater element is typically sandwiched between the back surface of the rear glass plate and the rear polarizer of the device. Typically, the backplane glass was approximately 0.75 mm thick. This provided ample electrical isolation between the ITO heater and the LCD but also resulted in an extensive warm-up time. At −54° C., an LCD display requires approximately 30 seconds warm-up time. A further improvement places the heater inside the display. U.S. Pat. No. 4,773,735 discloses an internal heater for an LCD). On an inside surface of the backplane glass, an internal heater is provided, using a resistant material. The internal heater is coated with an insulating layer, (typically the polyimide alignment layer) and back plane electrodes for the LCD are juxtaposed to the insulating layer, so that the insulating layer is between the internal heater and the backplane electrodes and nematic liquid crystal substance. However, even this arrangement has an insulating layer between the fluid and the heater, and the resultant extended warm-up time is considered to be inadequate for some applications, such as portable radios operating in cold environments. It is therefore desired to provide a quicker warm-up time for the LCD. It is further desired this system not cause aberrations in the normal performance of the LCD and that it has low power consumption during cold weather operation.

DETAILED DESCRIPTION OF THE PREFERRED EMBODIMENT

In accordance with the present invention, a solid state device such as a liquid crystal display (LCD) is provided with a heating arrangement in association with a backplane mounting substrate for the LCD. An integral heater on the inside face of the LCD is used to provide LCD response. The internal heater is used in a pulsed-on mode. Advantages include quick response time, small size and minimal current drain to the heaters.

Figure 1:
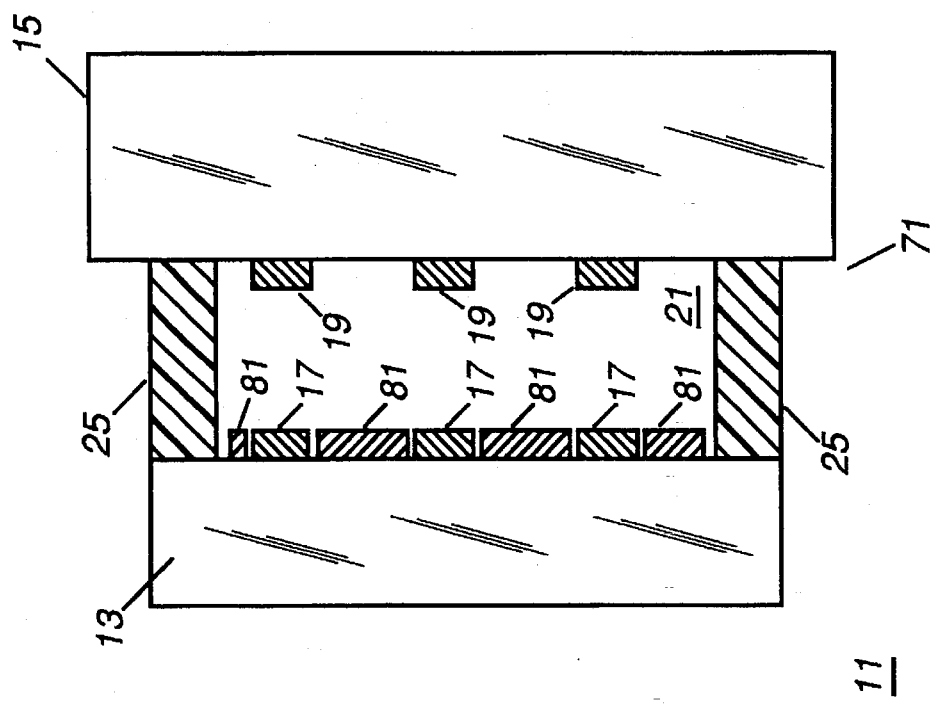
FIG. 1 shows a cross-sectional view of a liquid crystal display device having an integral heater in accordance with the invention.

While the specification concludes with claims defining the features of the invention that are regarded as novel, it is believed that the invention will be better understood from a consideration of the following description in conjunction with the drawing figures, in which like reference numerals are carried forward. Referring to FIG. 1, a typical liquid crystal display (LCD) 11 includes a backplane 13 and a cover glass 15. Between the backplane 13 and cover glass 15 are two arrays of electrodes 17, 19 and liquid crystal substance 21. The liquid crystal substance typically is an organic compound in a transition state between solid and liquid forms. Liquid crystals usually occur as viscous, jellylike materials that resemble liquids in certain respects (viscosity) and crystals in other properties (light scattering and reflection). The various esters of cholesterol are the best-known examples. They can align with dichroic dye molecules in a thin-layer cell to produce color changes in transmitted light. Of particular interest with electronic LCD displays are nematic liquid crystals, which react to biasing voltages applied across a layer of the crystals to darken as a result of the voltage disrupting the orderly arrangement of the crystal molecules. The darkening of the liquid crystal is enough to form visible characters in a pattern corresponding to a pattern of the electrodes 17, 19. The backplane 13 is typically made of an insulator such as glass. In prior art applications (not shown), backplane electrodes are coated or otherwise deposited onto the backplane. The cover glass 15 is also an insulator and the segment electrodes 19 are coated thereon. The liquid crystal substance 21 is contained between the backplane and the cover glass by seals 25. The electrodes 17, 19 are made of conductive or semiconductive materials such as indium tin oxide (ITO). Very little current is caused to flow through the electrodes 17, 19, so that the relative resistivity of thin layers of ITO electrode material do not adversely affect performance of the LCD device 11. The inventive LCD 11 is provided with a heating elements 81 which are used to bring the liquid crystal substance 21 to a preferred operating temperature. The heating elements 81 are formed on the inside surface of the backplane 13. It is also possible to place the heating elements 81 on any other inside surface of the LCD 11, much as electrodes are deposited onto the inside surface of the glass cover 15. The heating elements 81 are preferably made of a layer of copper oxide overlying a layer of indium oxide, tin oxide or indium-tin oxide (ITO), although other resistive materials may be used. In order to allow the backplane electrodes 17 to operate independently of current applied to the heating elements 81, the heating elements are interlaced among and between the electrodes.

The formation of the heating elements 81 and the electrodes 17, 19 are now described. As in the prior art, the electrodes 17, 19 are formed by vacuum depositing a layer of ITO on the glass-surface. However, in the instant invention, prior to patterning the electrodes, a second layer of copper is deposited on the ITO. In the preferred embodiment, both the ITO and the copper layers are deposited by sputtering, although other techniques such as evaporation may be used. The ITO/copper composite layer essentially covers the entire surface of the glass, and is then patterned to form the electrodes and the heating elements. The techniques of patterning the metal layer are well known in the art, and involve, for example, photolithography using dry film resists and etching with acids. Both the electrodes and the heating elements are patterned in the same step and are formed on the same layer or surface of the glass, thus the heating elements do not require any additional expenditure of time or materials, and are obtained for free. At the completion of the patterning, one finds a series of electrodes on the glass surface, along with a series of heating elements interlaced among and between the electrodes. The exact configuration of the electrodes is not critical, and can be customized by the designer to be whatever shape and layout that is most conducive to the available space and the amount of heating desired. For example, some displays may require greater amounts of heating than others, and would then require different considerations in the layout of the heaters. At this point, both the electrodes and heating elements are ITO with copper. Since both the ITO and the copper are very thin layers, the composite structure is transparent, and typically has a transparency greater than 70%. The ITo is typically about 100 Å–600 Å thick, and the copper is about 50–100 Å thick. Also, while the ITO as sputtered is electrically a poor conductor, the copper is electrically conductive, and the resulting sheet resistivity of the composite is typically less than 100 ohms per square. One skilled in the art will realize that resistances this low are good conductors and poor resistors, and that a heater should have high resistance. The portions of the pattern that will subsequently be the heating elements 81 are now selectively converted to a high resistance by heating them in an oxygen containing environment, such as normal atmosphere or pure oxygen. The heating elements 81 are selectively heated by electrically; bussing them to one or more common points and applying a current to them. The bussing step is typically done during the photolithography, where the heating elements are grouped or routed to one or more common points. Although the sheet resistivity is low, there is enough resistance to cause the energized ITO/copper traces to begin to slowly heat up. Note that since the display electrodes 17 are not being biased, they do not heat up. There is minimal, if any increase in temperature due to the close proximity of the heating elements, because the glass substrate sinks most of the heat prior to reaching the electrodes. As the heating elements 81 reach temperatures in excess of 110 degrees C, the electrically conductive copper converts to copper oxide, which is a nonconductor, thus increasing the resistance of the composite layer. The preferred temperature is about 150 degrees C. As the resistance increases, the heating elements 81 heat up even faster, until the copper metal is completely converted to copper oxide. By applying a constant voltage power supply, the current biased across the heating elements 81 decreases as the resistance increases, and thus the aging or oxidation of the copper is self controlling to a certain extent. At the completion of this step, the heating elements now have a sheet resistivity of greater than 1000 ohms per square, and the optical transparency is not significantly changed, but remains at approximately 70%.

Figure 2:
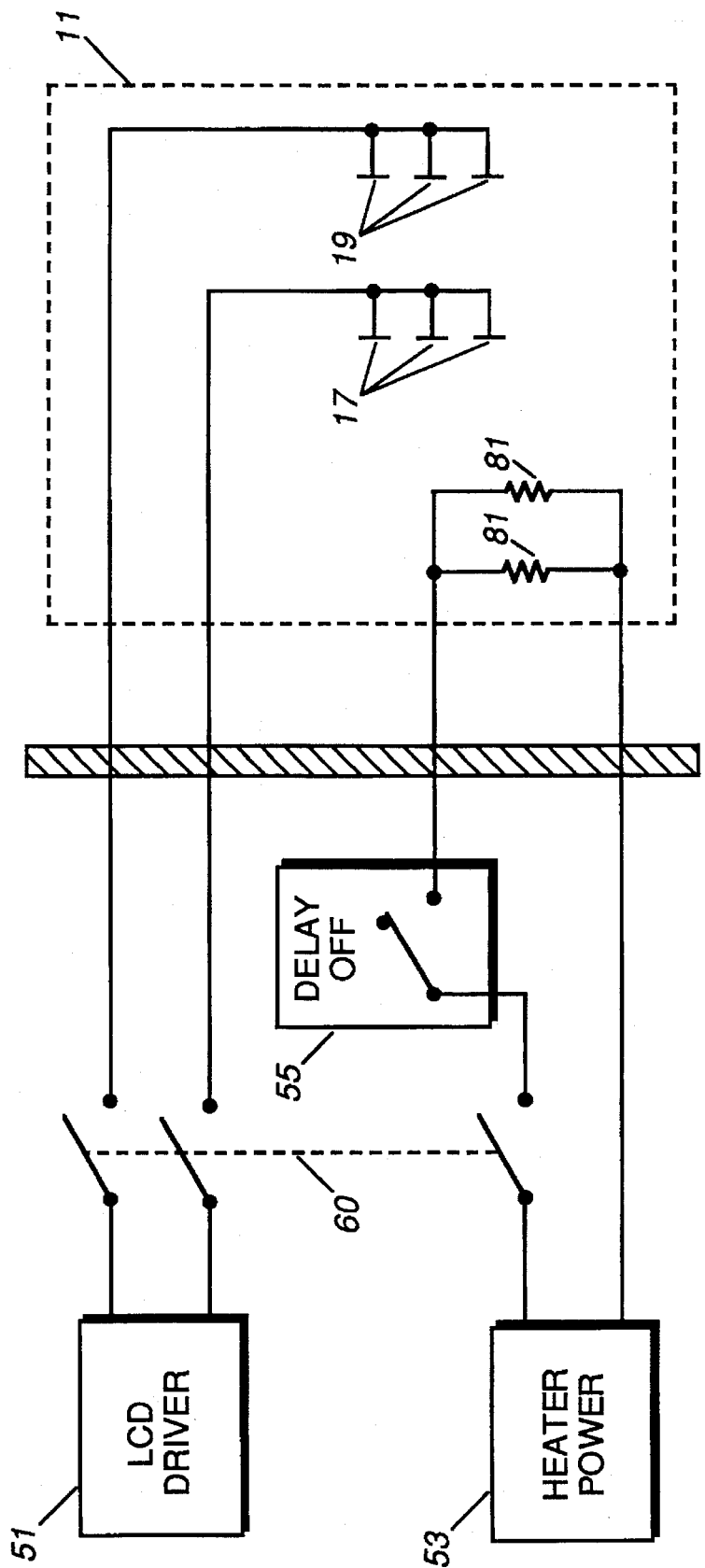
FIG. 2 shows a circuit for driving the embodiment of FIG. 1.

Having now described the LCD structure and fabrication of the integral LCD heating elements, the operation of the heating elements 81 is best explained with reference to FIG. 2, which schematically shows the circuitry used to drive the embodiment of FIG. 1. The LCD 11 is provided with display signals by a means for generating data, such as a display driver 51 which provides biasing voltages to the front and rear electrodes 17, 19. When the display 11 is activated by this electrical signal, a thermal addressing means, such as a heater power supply 53, is activated in response to another signal 60 from the display driver 51. The heater power supply 53 is connected to the heater elements 81, and activates them by applying still another electrical signal in the form of an electric current. Current to the heating elements is interrupted after a short time period by a delay circuit 55, and is re-established after another short period of time. Although the heating elements 81 are pulsed, the liquid crystal substance 21 rapidly heats up because the mass of material that needs to be heated is relatively small, and because the heat is not being transferred through the glass substrates. This pulsing of the heaters transfers enough heat to bring the liquid crystal substance 21 to an operating temperature that is adequate to effectively operate the display. In this arrangement, the heating elements 81 should be maintained at a relatively low power level in order to avoid causing the liquid crystal substance 21 to deteriorate. The pulsing is terminated when the signal from the display driver 51 is no longer present. This system provides a method for heating the liquid crystal fluid only when there is a signal from the display driver, and stops heating when the signal is no longer present, thus minimizing the amount of current that is consumed. Further, if desired, the heaters can be selected such that only those heaters proximate to the activated display electrodes are energized, instead of heating the entire display. This is a 'smart' mode of operation, where only the liquid crystal fluid that needs to be activated gets heated, thus reducing the amount of power that is consumed. This is particularly important for applications such as portable radios where battery power is limited.

An alternate embodiment of the heater operation provides maintaining a DC voltage connected to the high side of the heater and switchably connecting the low side of the heater to ground. Alternatively, a ground connection can be permanently effected to the low side of the heater with the heater DC potential switchably applied to the high side. With this integral heater arrangement, a capacitor is formed with the front and rear LCD electrodes providing one capacitor electrode and the heater providing the other capacitor electrode with the rear glass that separates the front and rear LCD electrodes from the heater providing the capacitor dielectric. With an alternating potential applied between the front and rear LCD electrodes and the heater connected to a fixed potential, an average DC current flows between the heater and the LCD electrodes because of the current path established between the LCD electrodes and heater power or ground resulting from the fixed potential connection to the heater. If the pulses are sufficiently short, the display 71 would only be momentarily blanked, thus providing a performance which is at least adequate during the initial operation of the display 71. During the time periods in which the internal heater element 81 is pulsed on, the display 71 may be blanked by showing the effects of the biasing inherent from energizing the internal heater element 81. If the time periods of the internal heater element 81 being pulsed on are sufficiently short this pulsing on should not significantly diminish the utility of display 71 during the warm-up period.

In summary, an advantage of not using an insulating layer is that the heater 81 can be deposited on the same surface as the backplane electrodes in a single deposition step. Further, size reduction is possible, as the LCD does not have an external heater, and the LCD can now be operated at subambient temperatures with minimal current drain from a portable power supply.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A liquid crystal display device with integral heating elements, comprising:

first and second substrates, each having an active face, the substrates; arranged in parallel fashion to form a uniform gap between them:

a plurality of electrodes, comprising a thin film of indium-tin oxide and copper, disposed directly on the active face of each substrate;

internal heating means, comprising a thin film of indium-tin oxide and copper oxide resistive heating elements interlaced among and between the plurality of electrodes, the internal heating means disposed directly on the active face of at least one of the substrates;

a liquid crystal fluid disposed in the uniform gap, in intimate contact with and responsive to the internal heating means: and absent an external heating mean.

2. A liquid crystal display device with integral heating elements, comprising:

first and second substrates, each having an active face, the substrates arranged in parallel fashion to form a uniform gap between them;

a plurality of electrodes disposed directly on the active face of each substrate;

internal heating means, comprising a plurality of resistive heating elements interlaced among and between the plurality of electrodes, the internal heating means disposed directly on the active face of at least one of the substrates;

the plurality of resistive heating elements having a sheet resistivity of about 10–1000 times greater than the sheet resistivity of the plurality of electrode;

a liquid crystal fluid disposed in the uniform gap, in intimate contact with and responsive to the internal heating means; and absent an external heating means.

3. A liquid crystal display device for operation at subambient temperatures, comprising:

first and second substrates, each having an active face, the substrates arranged in parallel fashion to form a uniform gap between them;

a plurality of electrodes comprising a thin film of indium-tin oxide and copper disposed on the active face of at least one substrate;

a plurality of heating elements comprising a thin film of indium-tin oxide and copper oxide disposed on the active face of at least one substrate;

the plurality of heating elements having a sheet resistivity between 10 and 1000 times greater than a sheet resistivity of the plurality of electrodes, and interlaced among and between the plurality of electrodes; and and a liquid crystal medium disposed in the uniform gap, a portion of the liquid crystal medium in the proximity of the plurality of heating elements being dependent on transient heating by circulation of an electric current within at least one of the plurality of heating elements, absent an external heater.

4. The liquid crystal display device as described in claim 3, further comprising a means for generating data, connected to the plurality of electrodes.

5. The liquid crystal display device as described in claim 3, further comprising a thermal addressing means, connected to the plurality heating elements, for selectively addressing the plurality of heating elements.

6. The liquid crystal display device as described in claim 3, wherein the plurality of heating elements is optically transparent.

7. A method of fabricating heater elements and electrodes for a liquid crystal display, comprising the following steps in the order named:

forming a composite metal layer on the surface of a glass substrate by sputtering a layer of indium-tin oxide on the glass surface and then sputtering a layer of copper on the indium-tin oxide layer;

photodelineating the composite metal layer to form a pattern comprising electrodes and heating elements, the heating elements being interlaced between the electrodes; and applying an electrical signal to only the heating elements in an oxygen-containing atmosphere, sufficient to cause the heating elements to heat to a temperature sufficient to cause the sheet resistance of the heating elements to increase to a level greater than 1000 ohms per square.

8. The method as described in claim 7, wherein the step of applying an electrical signal comprises applying a constant voltage signal.

* * * * *